May 23, 1961    D. H. CLAPPER    2,985,079

EARTH ROLLERS

Filed Nov. 2, 1955    2 Sheets-Sheet 1

INVENTOR
DONALD H. CLAPPER

BY *Albert J. Kramer*
ATTORNEY

May 23, 1961   D. H. CLAPPER   2,985,079
EARTH ROLLERS

Filed Nov. 2, 1955   2 Sheets-Sheet 2

*INVENTOR*
DONALD H. CLAPPER

BY *Albert J. Kramer*
ATTORNEY 2,985,079
Patented May 23, 1961

2,985,079
EARTH ROLLERS
Donald H. Clapper, R.D. 4, Montrose, Pa.

Filed Nov. 2, 1955, Ser. No. 544,486

4 Claims. (Cl. 94—50)

This invention relates to tractors and is more particularly concerned with devices for application to the wheels of a tractor for converting it into a roller.

One of the objects of this invention is the provision of means adapted to be removably secured to the wheels of a tractor for utilizing the tractor as a roller.

Another object of the invention is the provision of a tractor in combination with such removable means.

A further object is the provision of hollow members which can be removably attached to the pneumatic tires of a tractor by deflating the re-inflating the said tires.

A still further object of the invention is the provision of roller means attached to the front wheels of a tractor to compensate for the angularity of the plane of said front wheels relative to the vertical.

These and other objects and advantages of the invention will appear more fully from the following description considered together with the accompanying drawing.

Figure 1:
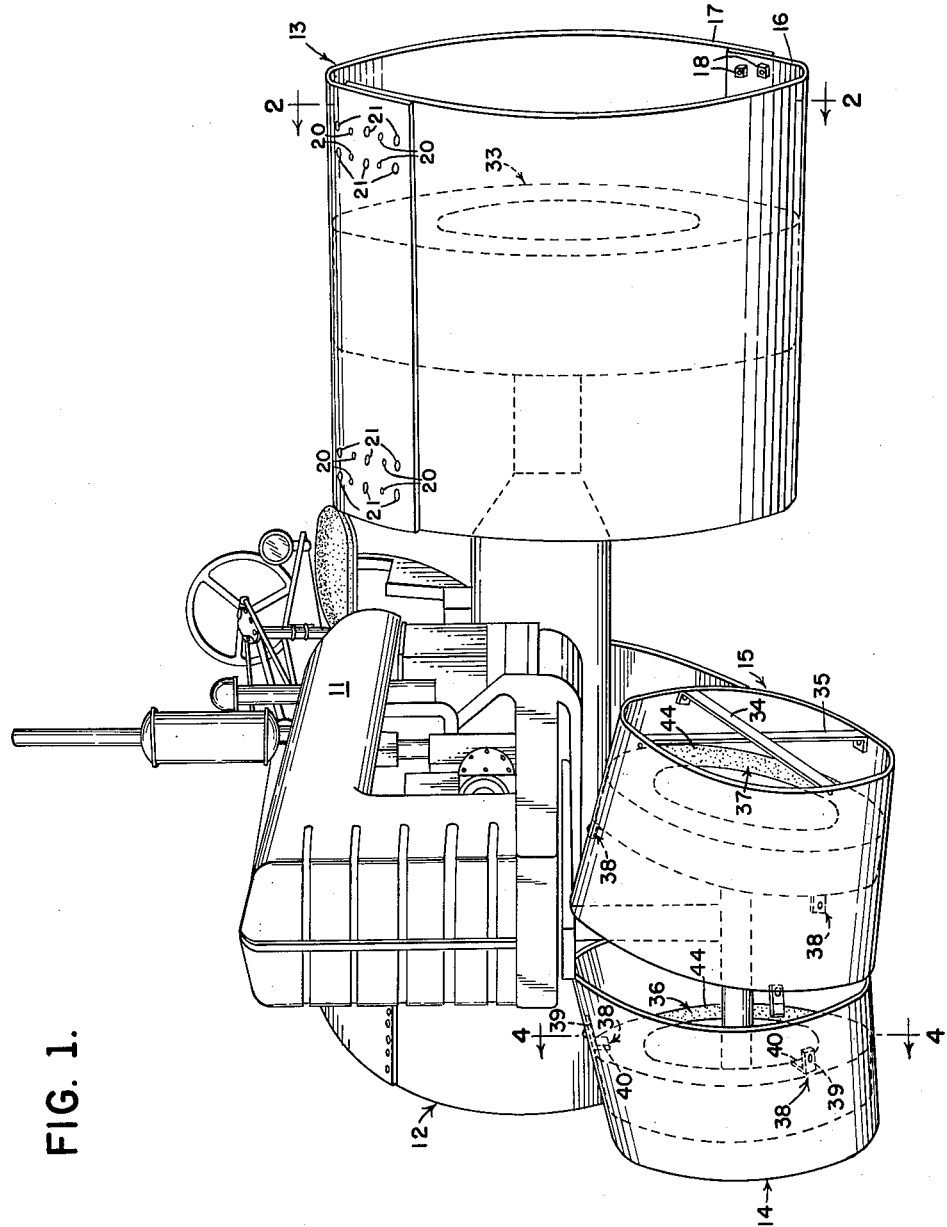
Fig. 1 is a perspective view of a pneumatic tired tractor to which there are attached roller members in accordance with an embodiment of this invention.
Figure 2:
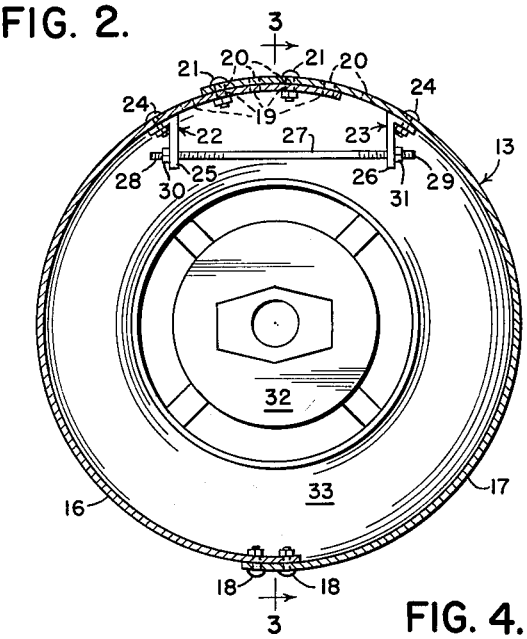
Fig. 2 is a vertical sectional view along the line 2—2 of Fig. 1.
Figure 5:
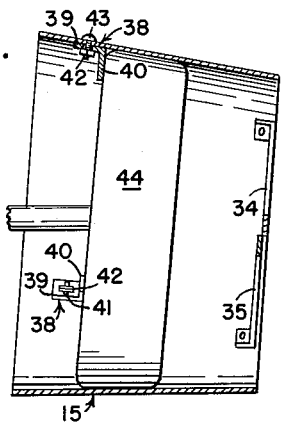
Fig. 5 is a cross-sectional view along the line 5—5 of Fig. 4.
Figure 3:
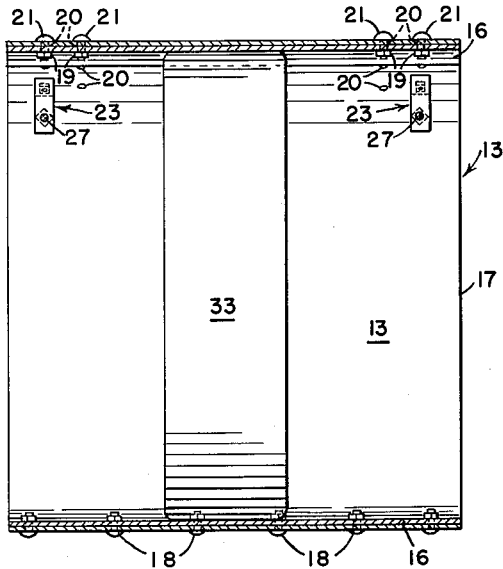
Fig. 3 is a sectional view along the line 3—3 of Fig. 2.
Figure 4:
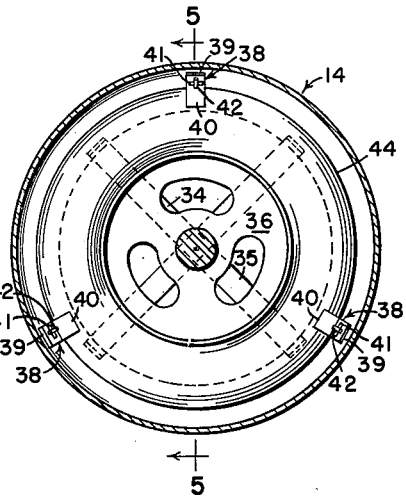
Fig. 4 is a vertical sectional view along the line 4—4 of Fig. 1.

Referring with more particularity to the drawing in which like numerals designate like parts, the embodiment illustrated comprises, in combination with a tractor generally designated by the numeral 11, a pair of rear hollow cylindrical drums 12 and 13 and a pair of front frusto-conical hollow drums 14 and 15.

The rear drums 12 and 13 are attached each to one of the rear wheels of the tractor. Each of these rear drums is in the form of a split cylinder and it is made of two steel semi-cylindrical members, such as the members 16 and 17 of the drum 13. These members are permanently connected together at one end, such as by bolts 18, as shown, or by any other suitable means. The other ends overlap a considerable amount, as shown, and are each provided with a series of rows of apertures 19 and 20 respectively, each row of one being registerable with the rows of the other.

This permits making these rear drums larger or smaller in diameter, as may be necessary in any particular case, and securing them in the desired diameter by holding bolts 21. This adjustment is facilitated by the use of two or more pairs of oppositely facing angle members 22 and 23, each member of the pair being secured to one of the members 16 and 17 at a point adjacent the overlapped ends by bolts 24. The opposite members 22 and 23 have inwardly projecting arms 25 and 26, parallel to each other, and a rod 27, threaded at both ends 28 and 29, slidably engages apertures in said arms 25 and 26, respectively, and carries adjusting or take up nuts 30 and 31 on the outer sides of said arms.

To place such a roller on a rear wheel 32 of the tractor, the wheel is jacked up, or otherwise elevated from the ground, and the pneumatic tire 33 on it is deflated. The roller after being adjusted to the desired diameter (smaller diameter would be used with, for example, markedly worn tire threads), is then placed about the wheel with the tire in approximately the medial position between the outer ends of the roller, as shown in Fig. 1. The tire is then re-inflated until it is tightly engage with the roller.

The front wheel rollers are disposed with their wide ends on the inside, facing each other. The outer or smaller ends are provided with radial bracing struts 34 and 35. The vertical angular relation of the axis of each front wheel roller is complementary to that of the plane of its respective wheel. On the interior of the front rollers there are also disposed adjacent the locus of the front wheels 36 and 37, retaining cleats in the form of angle pieces 38. One arm 40 of each cleat is adapted to abut the inner side of the wheel. The other arm 39 of the cleat 38 is provided with a slot 41 which is adapted to fit over a lug 42 pivotally mounted by means of a pintle 43 on the wall of the roller, substantially as shown.

These front rollers are similarly mounted on the front wheels of the tractor, by deflating the tires 44 thereof, after elevating the wheels from the ground, removing the angle pieces 38 and sliding the rollers in place. The angle pieces are then replaced on the lugs 42 and the tire re-inflated until it is in firm engagement with the roller.

The slope of the lateral surfaces of the front rollers are such as to compensate for the camber or angular displacement of the plane of the front steering wheels from the vertical to permit the front rollers, when mounted, to lie flat on the ground, as shown in Fig. 1. The camber of these wheels is, conventionally, to facilitate steering. The end diameters of the front rollers are greater and smaller, respectively, than the tractor wheel so that it can be placed on the wheel from one end and provide a point between the ends for forcibly contacting the wheel tire when inflated.

A tractor fitted with these rollers may be used for any general purpose for which ground rollers are ordinarily used, but it is particularly useful in rolling agricultural fields in the spring of the year soon after the frost has gone out of the ground.

A tractor thus equipped with rollers can not only be used for smoothing the ground, but can also be used as an ordinary tractor without added traction to tow agricultural machinery. For such purposes, it has the advantage that it leaves no deep ruts, smooths out the surface of the ground while pulling the machinery, causing less wear and breakage of machinery from mounds of dirt and stones above the ground surface. This, in turn, permits an increase of operational speed, and hence, greater efficiency. The care otherwise required to prevent breakage of machinery is obviated.

It also makes pastures easier to clip; it can be used to push down heaved and tilled stones, as well as heaved and exposed roots. It smooths out ruts that have been caused by other wheel type machines and implements.

It is also useful in rolling lawns, particularly those which have been freshly sodded, and it may be used in place of floating oat and corn ground.

The rollers can be readily removed from the tractor when the tractor is needed for other work, by simply elevating the respective wheels, deflating the tires, and removing the cleats 38 from the front rollers. After the rollers are removed, the tires are re-inflated and the tractor is ready for its normal operations.

Having thus described my invention, I claim:

1. In a tractor having cambered front ground steering wheels, the axes of rotation of said wheels being angularly disposed relative to the ground to facilitate steering, said wheels having pneumatic tires, hollow frusto-conical tubular members of rigid material surrounding said tires and being removably secured to the inside surface thereof by the outward pressure of air in said tires against the inner walls of the tubular members and by cooperating abutment means on the inner surface of said members, the axis of each frusto-conical member being substantially coincident with the axis of rotation of its respective wheel, said frusto-conical members having their larger ends facing each other.

2. In a tractor having cambered front ground steering wheel, the axes of rotation of said wheels being angularly disposed relative to the ground to facilitate steering, said wheels having pneumatic tires, hollow frusto-conical tubular members of rigid material surrounding said tires, the interior surfaces of said hollow members being in forcible contact with their respective tires, means on the said interior surfaces for restraining slippage of the tires toward the larger ends of the members, the axes of the members being substantially coincident with the axes of rotation of the wheels, respectively.

3. In a tractor having cambered front ground steering wheels, the axes of rotation of said wheels being angularly disposed relative to the ground to facilitate steering, said wheels having each a pneumatic tire and a hollow frusto-conical open ended member of rigid material surrounding said tire and being removably secured to the inner surface of said member, one of the open ends of the member being smaller than the inflated tire and the other open end being larger than the inflated tire, securing means on the interior surface of each member between the tire and the larger end to restrain the tire in its inflated condition from slippage along the interior surface towards the larger end, the axis of each frusto-conical member being substantially coincident with the axis of rotation of its respective wheel.

4. The subject matter defined by claim 3, and struts secured to the frusto-conical members across an open end thereof.

References Cited in the file of this patent

UNITED STATES PATENTS

| | | |
|---|---|---|
| 329,314 | Jerrold | Oct. 27, 1885 |
| 530,962 | Packham | Dec. 18, 1894 |
| 1,043,239 | Lee | Nov. 5, 1912 |
| 1,707,384 | Bixel | Apr. 2, 1929 |
| 1,882,373 | Storm | Oct. 11, 1932 |
| 1,935,950 | Lawrence | Nov. 21, 1933 |
| 2,179,793 | Lewison | Nov. 14, 1939 |
| 2,612,929 | Yeggy | Oct. 7, 1952 |
| 2,812,031 | Aghnides | Nov. 5, 1957 |

FOREIGN PATENTS

| | | |
|---|---|---|
| 348,569 | Great Britain | May 11, 1931 |
| 648,597 | Germany | Aug. 7, 1937 |